US009178565B1

(12) United States Patent
Woodruff et al.

(10) Patent No.: US 9,178,565 B1
(45) Date of Patent: *Nov. 3, 2015

(54) POWER LINE NETWORK SYSTEM AND METHOD

(71) Applicant: Landis+Gyr Technologies, LLC, Pequot Lakes, MN (US)

(72) Inventors: Roger W. Woodruff, Pequot Lakes, MN (US); Stuart L. Haug, Hackensack, MN (US)

(73) Assignee: Landis+Gyr Technologies, LLC, Pequot Lakes, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/298,503

(22) Filed: Jun. 6, 2014

Related U.S. Application Data

(63) Continuation of application No. 13/334,645, filed on Dec. 22, 2011, now Pat. No. 8,750,395.

(51) Int. Cl.
*H04B 3/54* (2006.01)
*H04B 3/56* (2006.01)

(52) U.S. Cl.
CPC ............... *H04B 3/56* (2013.01); *H04B 3/542* (2013.01); *H04B 2203/5416* (2013.01); *H04B 2203/5487* (2013.01)

(58) Field of Classification Search
CPC ........................................................ H04B 3/54
USPC .................. 375/257, 259, 284, 285, 295, 296
See application file for complete search history.

(56) References Cited

U.S. PATENT DOCUMENTS

| | | |
|---|---|---|
| 5,581,229 A | 12/1996 | Hunt |
| 6,154,488 A | 11/2000 | Hunt |
| 6,177,884 B1 | 1/2001 | Hunt et al. |
| 6,998,963 B2 | 2/2006 | Flen et al. |
| 7,102,490 B2 | 9/2006 | Flen et al. |
| 7,145,438 B2 | 12/2006 | Flen et al. |
| 7,180,412 B2 | 2/2007 | Bonicatto et al. |
| 7,184,861 B2 | 2/2007 | Petite |
| 7,209,840 B2 | 4/2007 | Petite et al. |
| 7,224,740 B2 | 5/2007 | Hunt |
| 7,236,765 B2 | 6/2007 | Bonicatto et al. |
| 7,346,463 B2 | 3/2008 | Petite et al. |
| 7,432,824 B2 | 10/2008 | Flen et al. |
| 7,443,313 B2 | 10/2008 | Davis et al. |
| 7,468,661 B2 | 12/2008 | Petite et al. |
| 7,706,320 B2 | 4/2010 | Davis et al. |
| 7,738,999 B2 | 6/2010 | Petite |
| 7,742,393 B2 | 6/2010 | Bonicatto et al. |
| 7,774,530 B2 | 8/2010 | Haug et al. |
| 7,791,468 B2 | 9/2010 | Bonicatto et al. |
| 7,877,218 B2 | 1/2011 | Bonicatto et al. |

(Continued)

*Primary Examiner* — Kevin Kim
(74) *Attorney, Agent, or Firm* — Crawford Maunu PLLC

(57) ABSTRACT

Various aspects of the instant disclosure are directed towards communicating symbols over a power line carrying alternating current, based upon frequency variations in the alternating current. In accordance with some embodiments, a line driver couples data-carrying symbols over the power line, via a waveform. Variations in the alternating current are monitored and used for accessing a lookup table that stores data entries that define data useful for providing steps of the waveform. The accessed data entries are used to drive a line driver with stepped data, and therein modulating alternating current on the power line with the data-carrying symbols at a frequency that is tied to the frequency of the alternating current.

20 Claims, 2 Drawing Sheets

(56) References Cited

U.S. PATENT DOCUMENTS

| | | |
|---|---|---|
| 7,978,059 B2 | 7/2011 | Petite et al. |
| 8,121,202 B2 | 2/2012 | Koga et al. |
| 8,144,816 B2 | 3/2012 | Bonicatto et al. |
| 8,144,820 B2 | 3/2012 | Bonicatto |
| 8,194,789 B2 | 6/2012 | Wolter et al. |
| 8,238,263 B2 | 8/2012 | Kohout et al. |
| 2008/0304595 A1 | 12/2008 | Haug et al. |
| 2010/0054348 A1 | 3/2010 | Choi et al. |
| 2010/0164615 A1 | 7/2010 | Bonicatto |
| 2010/0316169 A1* | 12/2010 | Uln et al. ............ 375/340 |
| 2011/0121952 A1 | 5/2011 | Bonicatto et al. |
| 2011/0176598 A1 | 7/2011 | Kohout et al. |
| 2011/0218686 A1 | 9/2011 | McHann, Jr. et al. |
| 2011/0249678 A1 | 10/2011 | Bonicatto et al. |
| 2012/0057592 A1 | 3/2012 | Zeppetelle et al. |
| 2012/0076212 A1 | 3/2012 | Zeppetelle et al. |
| 2012/0084559 A1 | 4/2012 | Bonicatto |
| 2012/0106664 A1 | 5/2012 | Bonicatto et al. |

\* cited by examiner

POWER LINE NETWORK SYSTEM AND METHOD

BACKGROUND

Service providers utilize distributed networks to provide services to customers over large geographic areas. For example, power companies use power distribution lines to carry power from one or more power-generating stations to residential and commercial customer sites alike. The generating stations use alternating current (AC) to transmit power over long distances via the power distribution lines. Long-distance transmission can be accomplished using a relatively high voltage. Substations located near the customer sites provide a step-down from the high voltage to a lower voltage (e.g., using transformers). Power distribution lines carry this lower-voltage AC from the substations to the endpoint devices customer sites.

Communications providers may utilize a distributed communications network to provide communications services to customers. Similarly, power companies utilize a network of power lines, meters, and other network elements to provide power to customers throughout a geographic region and to receive data about the power usage. However, data communication between a central collector and many thousands of endpoint devices over power distribution lines can be a particularly challenging issue. The sheer number of endpoint devices contributes to a host of issues including synchronization, communication bandwidth and cost concerns. Moreover, variations in alternating current carried on power lines can make the communication of data along with the current difficult to achieve.

These and other issues present challenges to the design and operation of power-line communication apparatuses, systems and networks.

SUMMARY

The present disclosure is directed to systems and methods for use with coordinated communications between devices and over power distribution lines. These and other aspects of the present disclosure are exemplified in a number of illustrated implementations and applications, some of which are shown in the figures and characterized in the claims section that follows.

Particular embodiments of the instant disclosure are directed towards communicating data-carrying symbols over a power line, such as by using a waveform. A lookup table that stores data entries that define data useful for providing steps of a waveform (e.g., sine-based) is accessed based upon symbols to be carried on the power line. Data in the table is used to drive a line driver with a corresponding waveform, based upon variations (e.g., based on the frequency or period of the current AC cycle) in alternating current carried by the power line. With this approach, the line driver is driven in a manner that is locked or closely related to the variations in the alternating current, facilitating the receipt and processing of the data as received over the power line.

Another embodiment is directed to a circuit having a line driver coupled to drive signals on a power line carrying an alternating current signal, a signal-monitoring circuit that monitors variations in the alternating current signal, having a lookup table that stores data entries that define data useful for providing steps of a waveform, and also having a logic circuit that accesses the data entries in the lookup table. The line driver couples a waveform used to carry data or data-carrying symbols (e.g., for passing decodable information) over a power line that carries an alternating current signal having a frequency or phase that varies, relative to a frequency or phase of previous cycles of the alternating current signal. The logic circuit accesses the lookup table in response to the signal-monitoring circuit, and feeds the line driver. Accordingly, the data in the lookup table can be pre-calculated and is accessed for processing and/or modulating the alternating current of the power line with the data-carrying symbols, based upon the variations in the alternating current signal.

The pre-calculated data can be implemented for the AC variations in different ways including, for example, as signal-level stepped data to reflect the amplitude along a particular point (in a series of time-spaced points) for defining a sine waveform being coupled to the power line for conveying the data or data-carrying symbols. In certain example embodiments, the pre-calculated data includes information for signal-level steps and/or timing-based steps. One or both types of steps can be used for defining the waveform that is to be presented (or coupled) to the power line.

In yet another example embodiment, a lookup table as may be implemented in a manner as discussed herein includes data identifying a rate at which a selected waveform should be accessed for the presentation of correct signal magnitudes to a power line. The table can also be configured to indicate time offsets for accessing the table's representations of the selected waveform. Thus, for a given category of the AC cycle (e.g., short versus long), the table-access timing (as opposed to rate) is predetermined for each category of waveforms and again, the coupling is a time-based update of the waveform as represented by a various points designated for that particular AC cycle category.

Other embodiments are directed to methods for coupling data-carrying symbols over a power line as discussed above and using combinations of such pre-calculated data, as appropriate for the complexity of the symbol, system data-throughput needs, computational power/efficiency for real-time applications, memory availability, and the like.

In accordance with another embodiment, one or more of the above-characterized methods is carried out by a programmed processor (e.g., microcontroller or other CPU-based circuit) using an interrupt mechanism for timing the communication of data over AC power lines. The processor is configured to generate the interrupts using a frequency synthesizer having a period defined by a time between the interrupts, with the time between the interrupts being set based upon a fixed number of interrupts to be generated during a cycle of the alternating current. The symbol values (e.g., the sum of two tones/frequencies and a phase offset between the two values) are provided. For each of the interrupts, values for each tone are accessed from a lookup table, based upon the tone values and the phase offset, and a transceiver is driven based upon the combined accessed values from the lookup table. In alternative schemes, a polling technique is used in place of, or in combination with, the interrupt scheme, for regular/timed accesses so as to maintain appropriate updates as used to present the correct waveform to the AC.

In accordance with yet another embodiment, methods and apparatuses are directed to a specific circuit-based approach involving generation of a complex waveform by sweeping through a sine-based data table which stores pre-calculated values. The form of the table permits a computationally-limited microcontroller to accommodate throughput (or speed) as needed to communicate the complex waveform to a line driver for presentation to the AC power line. Instead of burdening the microcontroller with having to update and constantly calculate and process information for proper presentation to the AC line, much of the relevant information is pre-calculated and stored in such a table for real-time access by the microcontroller. The sine table is read at different rates from different starting points for each tone and the values are added. This approach is used to generate the desired complex waveform very rapidly. Further, by measuring and predicting the time period of the next AC cycle with very high precision (as needed for any given application), the process can control these different rates from different starting points for each tone for proper delivery of the data to the AC line. Such delivery involves use of the pre-calculated values for the line driver. This can occur a set number of times for each AC cycle, e.g., by spacing these updates based on the prediction. In specific applications, the intervals can be set such that they are mostly identical, but some intervals are carefully selected to have a shorter or longer time to fit length of the AC waveform despite hardware limitations. Surprisingly, this approach for generating a complex waveform (in which the sum of two tones are represented) has been used to generate frequencies that are only 0.00001 Hz apart, while minimizing both processing time and computational burdens of the logic circuitry including the microcontroller.

The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description in connection with the accompanying drawings, in which.

Figure 1:
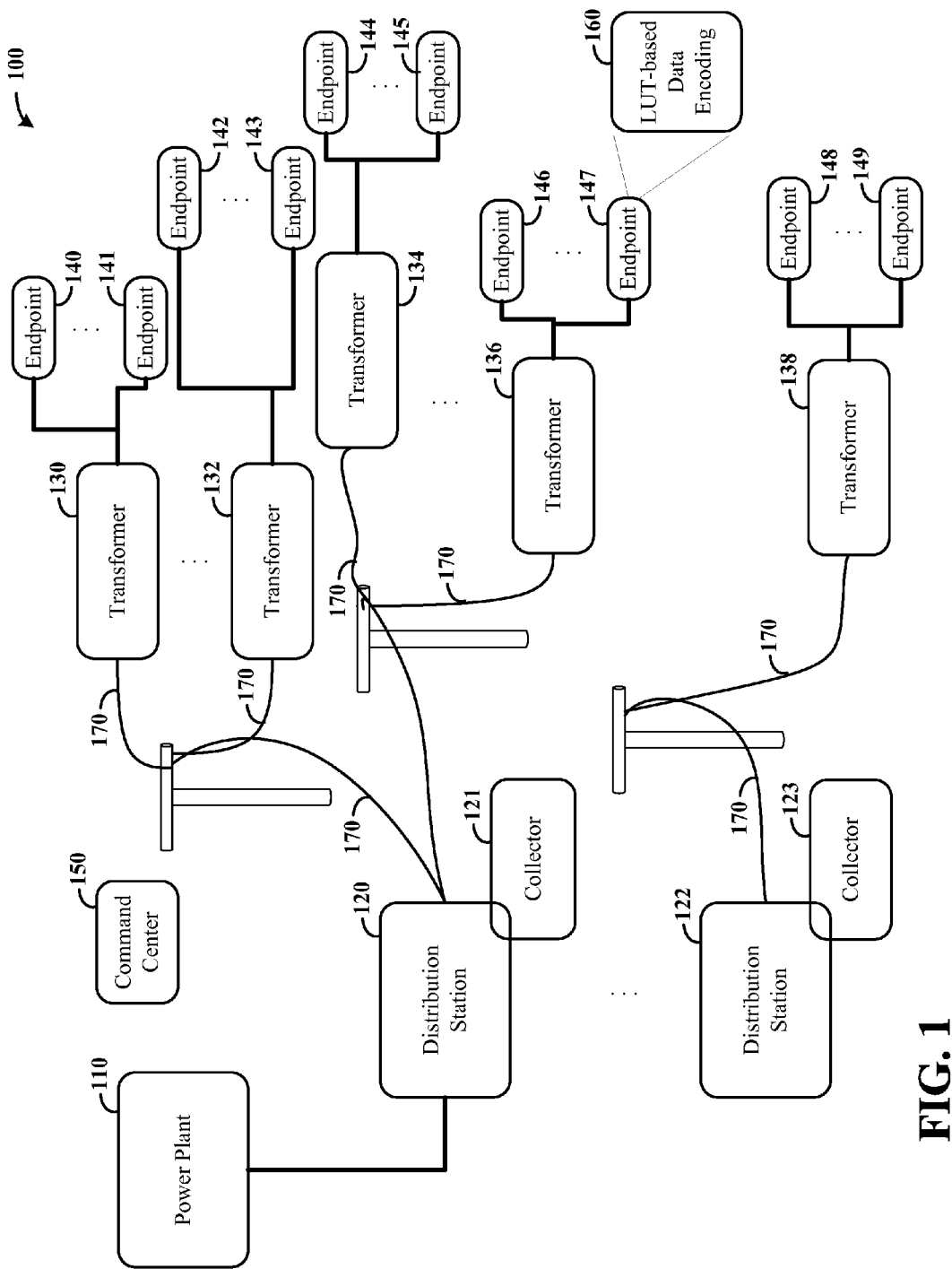
FIG. 1 shows communications apparatuses and a system, as may be implemented in connection with one or more embodiments of the present disclosure.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Aspects of the present invention are believed to be applicable to a variety of different types of devices, systems and arrangements that communicate over power distribution lines. While the present disclosure is not necessarily limited to such applications, various aspects of the disclosure may be appreciated through a discussion of various examples using this context. Moreover, aspects of the following discussion pertaining to methods may be implemented with apparatuses or systems.

Various example embodiments are directed to synchronizing a transmitter to the frequency of the alternating current carried on a power line, for transmitting symbols via modulation of a signal on the power line in accordance with variations in the alternating current. A lookup table (e.g., a data storage circuit storing lookup table information) is accessed to retrieve carrier wave values therein, based upon the alternating current (e.g., monitored frequency of the alternating current) and phase-offset tone values corresponding to data to be transmitted. The retrieved values are used to drive a signal on the power lines, with the driven signal being locked, or associated, with the frequency of the alternating current to facilitate detection thereof.

With this approach, information can be sent from remote locations on a power line that can be successfully decoded by a receiver, using a very small part of the available frequency range for each transmitter. Symbols can thus be transmitted as a complex waveform, as two summed tones at a set phase which represent a set of data bits, and imposed on a power line waveform such that the same number of waveforms (or fractions of a waveform) fit into each cycle of the power line signal. This approach can facilitate, for example, controlling the frequency to the 0.00001 Hz level, with the generation of two or more mixed tones that are sent with a phase offset, at a frequency in relation to the frequency changes of the power line. Both the transmitter and receiver can "lock" to the power line frequency as a reference to detect the narrow frequencies generated by the transmitter.

In one particular embodiment, a line driver is configured to drive and couple signals onto a power line that carries an alternating current signal, with a signal-monitoring circuit monitoring variations in the frequency of the alternating current signal, and with a lookup table that stores data entries to define data useful for providing (e.g., amplitude-level) steps of a waveform. The line driver couples a waveform used to carry data or data-carrying symbols (e.g., for passing decodable information) over a power line that carries an alternating current signal having a frequency or phase that varies, relative to a frequency or phase of previous cycles of the alternating current signal. The logic circuit accesses the lookup table in response to the signal-monitoring circuit, and feeds the line driver with a complex waveform that represents data-carrying symbols, based upon the variations in the frequency of the alternating current signal.

The pre-calculated data can be implemented as signal-level stepped data to reflect the amplitude along a particular point (in a series of time-spaced points) for defining the waveform being coupled to the power line for conveying the data or data-carrying symbols. In one example context, for a given pair of tones (or more than two tones), the symbol is conveyed as a complex waveform representing the summed tones (e.g., 21709.00333 Hz and 21709.03333 Hz) at a set offset phase (e.g., 180 degrees). Other respective examples include setting two tones to the same frequency, using (at least for a portion of a transmission) one tone. With reference to the exemplifying two-tone scheme, the particular points of the complex waveform represent the signal magnitudes (as accessed from the table) for coupling onto the power line one point at a time, for example, with the same number of waveform-representing points fitting into each (varying) cycle of the power line's alternating current. The table can be accessed at a rate that facilitates presentation of the correct signal magnitudes (perhaps skipping some table entries for a relatively long AC cycle) so that the coupling is a time-based update of the waveform as represented by the same target number (where the points are spread to fit the AC cycle).

In other example embodiments, the pre-calculated data includes information for signal-level steps and/or timing-based steps. One or both types of steps can be used for defining the waveform that is to be presented (or coupled) to the power line. As a variation to the above approach, an example in this regard involves a more memory-intensive embodiment and tracking AC cycle variations for use with one of a plurality of different target numbers of points through which to define the waveform over an AC cycle (e.g., one number for relatively short cycles and another for longer cycles). Using this approach, for any given symbol, if the current cycle of the AC is considered a longer cycle, one or more additional waveform-representing steps can be retrieved from the table (or from another waveform-defining table used for such longer cycles).

In yet another related example embodiment, the table includes data identifying a rate at which a selected one of the waveforms should be accessed for the presentation of the correct signal magnitudes to the power line. For example, based on the category of the AC cycle (short versus long relative to the expected average, or, alternatively, shorter, longer and about average), the table-access rate is first selected and then the appropriate (pre-calculated) waveform for that category of AC cycle is selected so that the coupling is a time-based update of the waveform as represented by a target number of points designated for that particular AC cycle category. As an alternative, the table can also be configured to indicate time offsets for accessing the table's representations of the selected waveform. Thus, for a given category of the AC cycle (short versus long), the table-access timing (as opposed to rate) is predetermined for each category of waveforms and again, the coupling is a time-based update of the waveform as represented by a various points designated for that particular AC cycle category. Moreover, different tables can be used to suit different needs, such as to provide different waveforms or to suit different processing and/or storage needs as may be determined as a tradeoff between available resources. This tradeoff may further depend, for example, upon a number of tones to be communicated, a desired accuracy of a signal, a modulation scheme for modulating alternating current, and other aspects that may affect computational and/or storage resources.

In another more particular embodiment, the lookup table entries represent stored data for any of a variety of complex-waveform communication on the power lines. For instance, the lookup table may store waveform-related parameters, such as steps corresponding to a stepped sine wave and/or time-related steps to define spacing of the updates used to implement the necessary waveform. As discussed, depending on the embodiment/application, the logic circuit may access the table in various ways to account for the variations in the alternating current signal. This approach may be implemented, for example, by executing the logic circuit lookup the same (or a different) target number of times for each cycle and therein tie the accesses and subsequent symbol communication to a frequency characteristic of the alternating current (e.g., whether 50,000, 100,000, 150,000 or over 200,000 times per second (or interrupts, polling, or events per cycle). In other particular applications, this target number can be set to any one or combination of target numbers. For less critical/accurate applications, the waveforms need not be defined with exact spacing or signal-level accuracy.

The resulting signal, such as a waveform, may thus be generated responsive to monitored variations in the frequency of the alternating current signal. Data in the table can be accessed and (optionally buffered) according to time-based signal generation, such as in response to zero-crossing or other event of the alternating current as useful for indicating the variation of the AC and when to drive the line driver with a fixed step value.

In some implementations, the signal-monitoring circuit includes a frequency-locked monitoring circuit that monitors the frequency of the alternating current. The logic circuit accesses the stored data entries a target number of times during each cycle of the alternating current signal, to feed the line driver with stepped data to drive a waveform on the power line. This may involve, for example, accessing stored data entries between 50,000 and 250,000 times during each second (or as another example, between 500 and 5000 times per cycle) of the alternating current, in accordance with the monitored frequency. The line driver may be driven with data retrieved from accesses to the lookup table using a common number of equally time-spaced accesses to the lookup table for consecutive cycles of the alternating current signal that have respectively different periods. Accordingly, the time-spacing between the accesses varies depending upon the monitored frequency, as may be detected for a current/previous cycle and used for transmission on a subsequent cycle.

In some aspects, the line driver, lookup table and logic circuit are part of a feedback control loop that couples data-carrying symbols via a waveform that is locked to variations in the frequency of the alternating current signal, for consecutive cycles of the alternating current that have respectively different periods.

A variety of types of data-carrying symbols can be communicated in accordance with various embodiments. For instance, data-carrying symbols that include multi-data-bit symbols can be represented by a pair of discrete-frequency signals and a phase offset between the pair of frequency signals. The multi-data-bit symbols can be synthesized into two sine-based waves that are summed to create a signal used by the line driver for transmission over the power line.

Other embodiments are directed to methods for carrying out various aspects as discussed above. These methods may employ circuits and/or other approaches as shown in and/or discussed in connection with the figures. In a particular method-based embodiment carried out in a processing circuit, a plurality of table accesses occur using a frequency synthesizer having a period defined by a time between the accesses, with the time therebetween being set based upon a fixed number of waveform points or steps to be generated during a cycle of alternating current (AC). For each of a plurality of symbols, two tone values and a phase offset between the two values are provided (e.g., generated), based upon data in the symbols. The values are accessed for each tone from a lookup table, based upon the tone values and the phase offset, and a transceiver is driven based upon the combined accessed values from the lookup table. These accesses may be effected, for example, as interrupt accesses which, as discussed herein, may be implemented as polling or events that may occur in a particular cycle.

In some implementations, an initial value is set in first and second accumulators respectively for the first and second tones, with a difference between the initial values being based upon the phase offset. First and second tweak values, respectively representing an amount added to the first and second accumulators for each transmit interrupt, are calculated using the tone values (in some embodiments, and/or a phase offset). The lookup table is accessed at each interrupt based upon the value in the accumulator for the respective tones. After the accumulator values have been used for a current interrupt, the values in the first and second accumulators are respectively increased using the first and second tweak values, for use at a next respective interrupt. This approach facilitates sweeping of the lookup table at the respective frequencies of the first and second tones.

Another embodiment is directed to a circuit-based apparatus for communicating over power distribution lines carrying alternating current (AC) power. The apparatus includes a digital to analog converter (DAC), a frequency locked loop (FLL) circuit, a symbol generator circuit, a data storage circuit and a synthesizer circuit. The FLL circuit generates a target value defining a base period for each interrupt, based upon a frequency of the AC power, with the number of interrupts being generated for each cycle of the AC power being constant. The symbol generator circuit selects two frequencies and a phase based upon a binary pattern being communicated over the power distribution lines for each symbol. The selected frequencies (and in some embodiments, phase) are used to calculate counter tweak values, such as discussed above, and a start value for the accumulator for a second tone is calculated based upon a phase selected by the symbol generator circuit. The data storage circuit stores a waveform table having values representing step values of a wave and having half a maximum voltage of the DAC. The synthesizer circuit is responsive to each interrupt generated by the FLL circuit, by generating and providing an output signal to the DAC by indexing into the waveform table to retrieve two wave values (e.g., sine-based values) respectively based upon bits in each of two accumulators. These values correspond to first and second tones having a fixed phase relationship, and add the retrieved sine values to generate a complex waveform. In response to a new symbol, the accumulator for the first tone is cleared and the accumulator for the second tone is set to the start value provided by the symbol generator, therein setting a sweep of the sine table at an offset that matches the phase difference of the new frequencies (tones) selected by the symbol generator circuit.

In accordance with one or more embodiments, a direct digital synthesizer (DDS) combines two tones and implements a phase relationship, while keeping a number of interrupts per a power line cycle constant to lengthen and shorten the time between DDS interrupts, for use in accessing a sine table for driving a line driver and therein communicating symbols over the power line. This changes the rate that the sine table is swept for both tones, which adjusts the frequency so that they are in a fixed relationship to the power line cycles. A receiver on the same power line, when similarly locked to the power line cycles, can accurately determine the frequency of the tones and their phase relationship, and therein allows each tone to be narrower which allows more transmitters to be active in the same range of frequencies.

By pre-calculating the waveform table, tweak values can be calculated once per symbol (e.g., as opposed to using interrupt-based logic) thereby reducing the processing time of the DDS logic. The accumulator as discussed above, and as implemented with the tweak values, results in an index into the table using a single add and read to generate one tone. Adding the two voltage values results in the tones being used to create a mixed or complex waveform/signal as represented by a waveform template that is ½ a maximum digital-to-analog (D/A) register's range (for driving the signal on an AC line). By offsetting the second tone's accumulator once at the beginning of a symbol, the phase relationship is established and needs no further calculation. This approach facilitates microprocessor operation at a very high interrupt rate to create accurate frequencies, and can be implemented using one table (interrupt/poll) access, one counter, one timer, and one D/A port. For instance, a multi-tone frequency shift keyed with relative phase transmitter can be synchronized to the frequency of a power line (e.g., 50 Hz or 60 Hz power line), with the synchronization carried out in an accurate manner so that a remote receiver that is also synchronized to the power line can receive a signal (e.g., to an accuracy of about 0.00001 Hz). For further information regarding implementation details of such a transmitter, reference may be made to U.S. Patent Publication No. 2010/0164615 entitled "System And Method For Relative Phase Shift Keying," and filed Dec. 31, 2008, which is fully incorporated herein by reference.

In some implementations, a line lock is achieved using a hardware signal that detects the rising edge of the power line signal, captures the value of a high precision hardware counter, and generates an interrupt. This counter value is one input to a frequency locked loop (FLL) logic circuit. A second signal for the FLL circuit comes from a direct digital synthesizer logic (DDS) circuit, which is generated when the DDS determines that it has processed enough interrupts for one cycle of the power line. The DDS records the reading of the same high precision counter used for the capture of the power line zero crossing. When both signals are completed (the order of completion changes dynamically as the frequency of the power line changes), the FLL logic circuit is activated.

The FLL logic circuit uses the difference in time (counts) of the two input signals to drive a proportional-integral-differential (PID) engine. This PID engine filters the input signals and uses a variation of the standard PID logic to generate a target, in DDS timer counts, for the next power line cycle to reduce the difference in the two signals. The variation of this PID logic is used to gate the integral part of the calculation based on the magnitude of the proportional difference, with the integral coefficient used as a divisor instead of a multiplier. Both changes reduce the effect of the integral correction to enable the PID to use high precision input values (the bigger counter, the larger the number that can be "remembered" by the Integral part of the PID).

The target value generated by the FLL logic circuit is used as the base period for each DDS interrupt timer during the power line cycle. The DDS timer is set every DDS interrupt to a value that will result in a constant number of interrupts per power line cycle, with this target value being a floating point value, while the timer register in the hardware is a fixed point value (no fraction). When the DDS logic circuit converts the target value to a fixed value, it loses accuracy and an error accumulator is used to compensate.

In some implementations, the DDS compensates for the accuracy error by adding the FLL target to a floating point accumulator, using the fixed point value to the left of the decimal of this accumulator for the timer register, and then subtracting this fixed value (converted to floating point) from the accumulator. The accumulator accumulates the "unused" fraction parts, which will add up to result in an extra count at regular intervals. Evenly adding in extra counts during the cycle prevents generating unwanted frequencies while ensuring the time to the end of the cycle is accurate.

With this approach, the transmitter logic is executed the same number of times for each power line cycle. This locks the signal being sent for the symbol to the line frequency. The rest of the transmitter logic generates the signal used to drive a digital to analog (D/A) converter that drives a power line carrier (PLC) transmitter.

For each symbol being transmitted, the transmitter generates a combination of two tones with a fixed phase relationship of 0 to 359 degrees. The symbol generator receives a signal from the DDS when it uses a symbol, which causes the next symbol to be generated. Based on the binary pattern being sent, two frequencies and a phase are selected and used to calculate two tweak values such as discussed above, representing an amount added to an accumulator every transmit interrupt and causing the DDS to sweep a waveform table at the tone's frequency. The symbol generator then calculates the starting value for the accumulator of the second tone based on the phase relationship of the symbol.

To generate the D/A output signal, the DDS uses bits in each of two accumulators to index into the table at each timer interrupt. The table values may represent, for example, the D/A bits for a sine wave of ½ the maximum voltage of the D/A. Each accumulator is used to get the wave value and these values are added together, which combines the two tones of the symbol. The tweak value and the DDS interrupt rate cause the table to be swept at the frequency of each tone, and adjusted to be locked to the power line frequency. As the DDS starts a new symbol, it clears the accumulator of the first tone and sets the accumulator of the second tone to the value provided by the symbol generator. This causes the table sweep to start at an offset that matches the phase difference of the tones.

Turning now to the Figures, FIG. 1 shows communications apparatuses and system 100, as may be implemented in connection with one or more example embodiments of the present disclosure for communication with endpoints for configuration thereof. As discussed herein, the various approaches may be implemented in connection with a variety of different power line communication network environments, using one or more power lines and as may involve one or more transformers and distribution stations. Accordingly, FIG. 1 shows one such implementation.

A power plant 110 distributes power to a plurality of distribution stations (e.g., substations) including stations 120 and 122. Each respective distribution station has a CPU-based data collector circuit ("collector") 121 and 123. The distribution station 120 is coupled to distribute power to transformers 130, 132, 134 and 136. Distribution station 122 is coupled to distribute power to transformer 138. Other configurations may also be implemented, such as with distribution station 122 being coupled to also supply power to one or more of the transformers 130, 132, 134 and 136.

Each of the respective transformers is coupled to one or more endpoints, which are respectively coupled to receive utility-based data such as power meter data, readings of water utilities, readings of gas utilities, status conditions or diagnostic data. By way of example, endpoints 140 and 141 are coupled to transformer 130, endpoints 142 and 143 are coupled to transformer 132, endpoints 144 and 145 are coupled to transformer 134, endpoints 146 and 147 are coupled to transformer 136, and endpoints 148 and 149 are coupled to transformer 138. However, a multitude of such endpoints may be coupled to each transformer, to serve thousands of users at each endpoint.

In some implementations, a command center 150 (such as a CPU-based data processing system) controls one or more aspects of communications with each collector (121, 123), by communicating with the collector over a communications network that may differ from a power line communications network. The collectors are typically CPU-based devices that can be implemented in various forms as would be appreciated by the discussion herein. Accordingly, the command center 150 may control the communication of data to endpoints via the collectors, or couple data received at the collectors, such as by accessing utility-based data for devices at the respective endpoints.

Each of the respective endpoints 140-149 communicates with one or more collectors 121 and 123 over the power distribution lines 170 as shown, as the lines carry AC power. Accordingly, the respective endpoints share bandwidth over the power distribution lines, as may be relevant to concurrent communications and/or time-based communications involving different time periods during which each respective endpoint (or groups of endpoints) communicate. This approach may be carried out to facilitate effective communications with an acceptable or desirable amount of errors, in managing available bandwidth.

One or more of the endpoints include a lookup table-based encoding circuit 160, which couples data to the power lines and, therein, to the collectors 121 and 123. The endpoint or endpoints using the lookup table-based encoding circuit 160 operate to generate and send data using a fixed number of accesses/operations for each cycle of alternating current passed on the power lines. In this context, data is synchronized to the alternating current as discussed herein.

Figure 2:
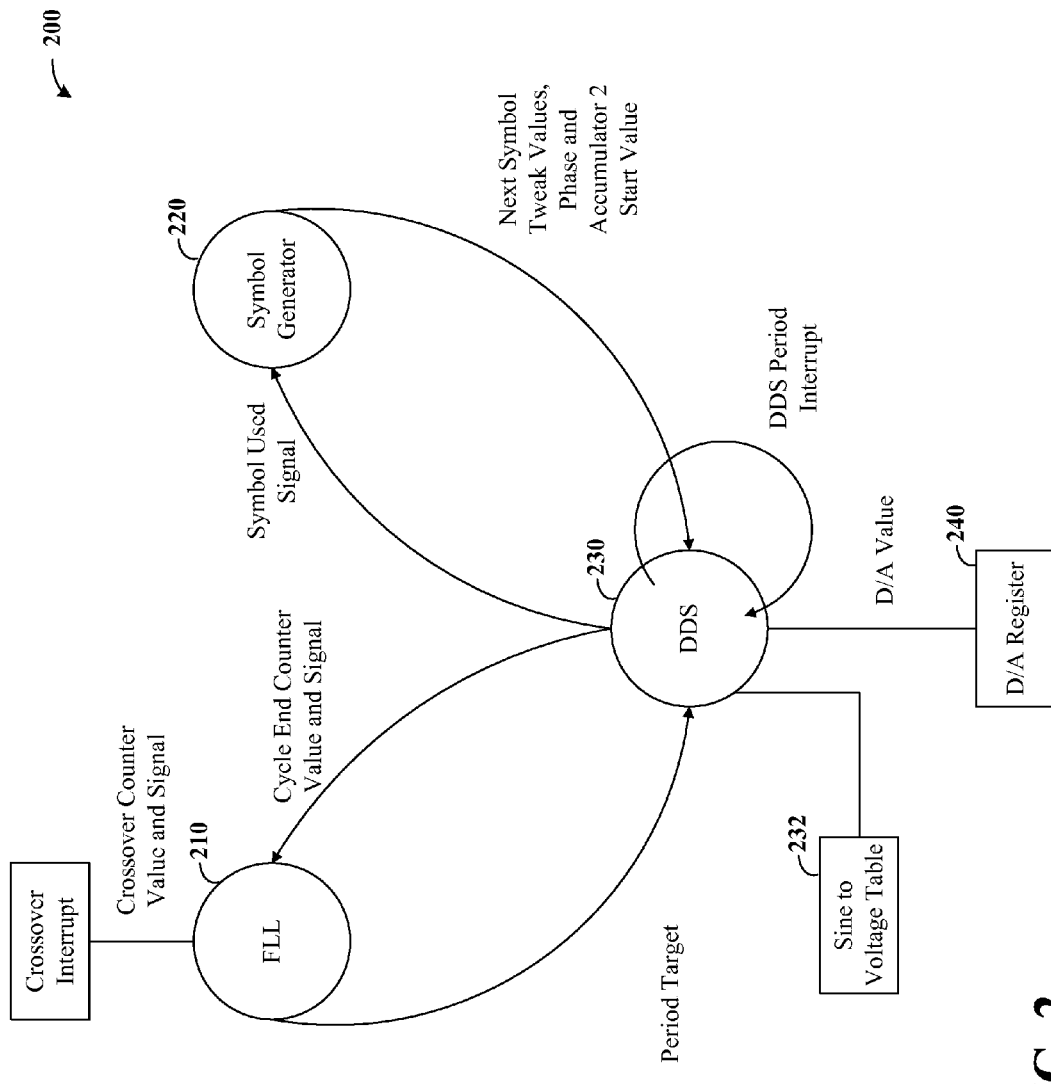
FIG. 2 shows an apparatus and data flow diagram, consistent with other embodiments of the present disclosure.

FIG. 2 shows an apparatus 200 and data flow diagram, as one of many different ways that is consistent with other embodiments of the present disclosure. The apparatus includes a frequency locked loop circuit 210, a symbol generator circuit 220 and a direct digital synthesizer logic circuit 230, which accesses and uses a lookup table 232 to provide an output to a digital-to-analog (D/A) register 240 for driving a digital-to-analog converter (DAC).

In response to a crossover interrupt (e.g., a zero crossing of alternating current), the FLL 210 sends data identifying a target period to the DDS 230, which uses the target period in accessing the lookup table 232. The symbol generator 220 generates data including a symbol, tweak values (as further discussed herein), phase between tones and a starting accumulator value for a second tone (therein setting an offset between tones). This information is generated once per symbol, and can be carried out in response to data indicating that a previous symbol has been used as presented by the DDS 230.

At each interrupt, the DDS 230 accesses the lookup table 232, based upon values in an accumulator for each of the tones. Accumulators for each tone are augmented for each interrupt by the tweak values. The DDS 230 stores the accessed data in the D/A register, which is used to drive a DAC.

The following embodiments characterize one or more aspects that may be carried out in accordance with FIG. 2. In this context, the following discussion makes reference to FIG. 2 for illustration. The values in the lookup table 232 (sine to voltage table) are pre-calculated once, and include a set of numbers that when sent in order to the D/A register 240 will cause the output to be a stepped (not perfect) sine wave. If every other value in the table is sent in order, the output will still be a sine wave but it will have even larger steps between voltage changes. External circuitry filters this output into a smooth waveform.

The FLL circuit 210 locks onto a primary signal and predicts the time (period) of the next primary signal's cycle (e.g., for a 50/60 Hz power line). The FLL circuit 210 adjusts its prediction every primary cycle. The DDS circuit 230 uses this prediction to generate a large, fixed number of interrupts such that they all fit in the predicted time of the next primary signal's cycle. This interrupt is the signal that drives the synthesis of the waveform to the D/A Register 240, and is the DDS circuit 230's clock. The time between interrupts is not a fixed value. Because of the granularity of the timer used to generate the interrupts, each interrupt time may be adjusted a small amount to fit all the interrupts into the primary signal's cycle with no time left over. Each DDS interrupt process, besides generating the D/A Register value, also keeps a sum of fractional timer bits that could not be inserted because of the timer's granularity. When these fractional bits add up to a bit or more, then an extra bit is inserted for the next interrupt cycle and subtracted from the fractional bit total. This process doesn't induce any unwanted waveform into the output signal, but still fits all the interrupts precisely into the variable length primary signal's cycle time.

To generate the desired waveform, the symbol generator circuit 220 calculates three values, and the DDS circuit 230 informs the symbol generator whenever it uses a set of these values. Accordingly, the symbol generator 220 generates a new set while the current symbol is being sent. In this embodiment, a symbol is implemented as the combination of two tones and the phase relationship between them (e.g., a 180 degree phase difference). Various implementations are directed to the use of one or more of a variety of numbers of tones, to the limit of how much time it takes to calculate the D/A register 240 value during a DDS interrupt.

The first two values that the symbol generator circuit 220 calculates for the DDS circuit 230 are increments to the two DDS transmit accumulators. The value is based on the size of the accumulator register and the frequency of the tone and the fixed number of interrupts per second (not primary cycle). The increment sets the rate at which the lookup table 232 is "swept". For instance, if the increment is set such that every value in the sine table was read and sent to the D/A register 240 every primary cycle of sixty cycles per second, then the frequency generated would be at 60 Hz. If the increment is twice that value, the frequency would be 120 Hz because the table would be completed twice in one primary cycle. If the increment were such that only $1/60^{th}$ of the table is used during a primary cycle, then the output frequency would be 1 Hz. The increment value is the desired frequency times a constant, which is the accumulator size divided by the number of interrupts per primary cycle.

The third value the symbol generator circuit 220 sets is the phase. It does this by supplying the value to start the accumulator for the second tone. This start value offsets the location in the sine table for the second tone. Since it starts at a different location in the sine table, this sets a phase difference between the tones. To generate two tones that are 180 degrees out of phase, the symbol generator circuit sets the start value for the second accumulator to 180/360 times the size of the accumulator.

At the end of a symbol, the DDS circuit 230 sets its accumulator for tone 1 to zero, sets its accumulator for tone 2 to the value supplied by the symbol generator circuit 220. At every interrupt during the symbol, the DDS circuit 230 adds the increments to the accumulators, uses the accumulator values to read two values from the sine table, adds them, and sends them to the D/A register 240. Every primary signal cycle, the FLL circuit 210 adjusts the time between DDS interrupt to keep the tones generated in sync.

In a particular embodiment, the DDS circuit uses accumulators that hold a maximum of 1199 (size is 1200), the number of interrupts the DDS uses is 1200 per second or 20 per primary signal cycle at 60 Hz, and the lookup table 232 includes 1200 entries. If tone 1 is 1 Hz, then the increment value is set by the symbol generator circuit to 1*1200/1200 or 1. If tone 2 is 2 Hz, the symbol generator circuit 220 sets the increment value for tone 2 to a 2. If the phase difference is 180 degrees, then the pre-set value for tone 2's accumulator is 600 (180/360 times the size of the accumulator).

With the number of interrupts per second set to 1200, the number of interrupts per primary signal cycle is 1200/60 or 20. For each primary signal cycle, the DDS circuit 230 uses the value in accumulator 1 (which starts at 0 at the beginning of a symbol) to index into the lookup table 232 to read a value and add increment 1 (which is a one) to accumulator 1. The DDS circuit 230 does the same for accumulator 2, but since it started at 600 the value it gets is in the middle of the sine wave and the increment is two so accumulator 2 is set to 602. These two lookup table values are added and sent to the D/A register 240. At the end of the first primary signal's cycle, accumulator 1 will be 20 and accumulator 2 will be 640. When 30 primary cycles have passed, accumulator 1 will be 600 and the accumulator will wrap around and also be at 600, as the increment for signal two is driving the accumulator through the lookup table 232 twice as fast as signal one. At the end of 60 primary signal cycles, accumulator 1 will be back to 0 and accumulator 2 will be back to 600. The values that were read for signal 1 will be every value in the lookup table 232 from the first to the last in order. For signal two, every other value is used twice. The waveform for signal one is at 1 Hz, and the waveform for signal two is 2 Hz. These signals are combined by an adder and phase shifted by the non-zero initial value of accumulator 2.

Consistent with various embodiments of the present disclosure, the power distribution lines can carry power that is provided from one or more power-generating stations to residential and commercial customer sites alike. The generating station uses AC to transmit the power long distances over the power distribution lines. Long-distance transmission can be accomplished using a relatively high-voltage. Substations located near the customer sites provide a step-down from the high-voltage to a lower-voltage (e.g., using transformers). Power distribution lines carry this lower-voltage AC from the substations to the customer sites. Depending upon the distribution network, the exact voltages and AC frequencies can vary. For instance, voltages can generally be in the range 100-240 V (expressed as root-mean-square voltage) with two commonly used frequencies being 50 Hz and 60 Hz. In the United States, for example, a distribution network can provide customer sites with 120 V and/or 240 V, at 60 Hz.

The signals and associated logic and functionality described in connection with the figures can be implemented in a number of different manners. Unless otherwise indicated, various general purpose circuit systems and/or logic circuitry may be used with programs in accordance with the teachings herein, or it may prove convenient to construct a more specialized apparatus to perform the required method. For example, according to the present disclosure, one or more of the methods can be implemented in hard-wired circuitry by programming a general-purpose processor, other fully or semi-programmable logic circuitry, and/or by a combination of such hardware and a general-purpose processor configured with software.

It is recognized that aspects of the disclosure can be practiced with computer-based/processor-based system configurations other than those expressly described herein. The required structure for a variety of these systems and circuits would be apparent from the intended application and the above description.

The various terms and techniques are used by those knowledgeable in the art to describe communications, protocols, applications, implementations, mechanisms, etc. One such technique is the description of an implementation of a technique expressed in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, it is recognized that a block denoting "C=A+B" as an additive function whose implementation in hardware and/or software (e.g., as represented by functionally-enable hardware/software modules) would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions can be stored for execution in a manner consistent with one or more of the methods of the present disclosure. The instructions can be used to cause a general-purpose or special-purpose processor that is programmed with the instructions to perform the steps of the methods. Alternatively, the steps might be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions.

The various embodiments described above are provided by way of illustration only and should not be construed to limit the disclosure. Based on the above discussion and illustrations, those skilled in the art will readily recognize that various modifications and changes may be made to the present disclosure without strictly following the exemplary embodiments and applications illustrated and described herein. For instance, such changes may include variations on mechanisms for synchronization with (and/or tracking of) the AC line frequency and/or the use of communication protocols that are not expressly mentioned. Other approaches may involve accessing a lookup table based upon tones generated in other manners, and/or storing additional information in a lookup table. Still other approaches may involve using one or more of various waveform types, such as sine-based waveform. Such modifications and changes do not depart from the true spirit and scope of the present disclosure, which is set forth in the following claims.

What is claimed is:

1. A circuit comprising:
a line driver configured and arranged to couple data-carrying symbols over a power line, via a waveform, that carries an alternating current signal having a frequency or phase that varies, relative to a frequency or phase of previous cycles of the alternating current signal, the data-carrying symbols corresponding to respective information signals;
a signal-monitoring circuit configured and arranged for monitoring variations in the alternating current signal;
an encoding circuit configured and arranged to provide encoded parameters that define, at least in part, data useful for providing steps of the waveform to account for the variations; and
a logic circuit configured and arranged to respond to the encoding circuit by feeding the line driver with stepped data that is processed for modulating the alternating current signal of the power line with the data-carrying symbols.

2. The circuit of claim 1, wherein the steps are signal-level steps.

3. The circuit of claim 1, wherein the logic circuit is configured and arranged to generate one of a plurality of waveforms, responsive to monitored variations in the alternating current signal.

4. The circuit of claim 1, wherein the logic circuit is configured and arranged to feed the line driver with stepped data that is processed for modulating the alternating current signal of the power line with a complex waveform that represents the data-carrying symbols.

5. The circuit of claim 1, wherein the steps are time-based steps.

6. The circuit of claim 1, wherein the signal-monitoring circuit includes a frequency-locked monitoring circuit configured and arranged to monitor the frequency and to track or indicate variations in the frequency of the alternating current signal, and wherein the logic circuit is configured and arranged to feed the line driver with stepped data to drive a waveform on the power line.

7. The circuit of claim 1, wherein the encoding circuit includes a lookup table.

8. The circuit of claim 7, wherein the line driver and the logic circuit are configured and arranged, with the lookup table, to transmit a signal based upon a target number of accesses to the lookup table, the target number being a number between 50,000 and 200,000 per second, or 500-5000 times per cycle.

9. The circuit of claim 8, wherein the logic circuit is configured and arranged to determine time spacing between the accesses to the lookup table, based upon a previous cycle of the alternating current signal.

10. The circuit of claim 1, wherein the line driver, the encoding circuit and the logic circuit are part of a direct digital synthesis signal generator.

11. The circuit of claim 1, wherein the line driver, the encoding circuit and the logic circuit are part of a feedback control loop that is configured and arranged to couple the data-carrying symbols via a waveform that is locked to variations in the frequency of the alternating current signal for consecutive cycles of the alternating current signal that have respectively different periods.

12. The circuit of claim 1, wherein the line driver is configured and arranged to couple data-carrying symbols that are multi-data-bit symbols arranged to be transmitted by conveying a pair of discrete-frequency signals and a phase offset between the pair of discrete-frequency signals.

13. The circuit of claim 12, wherein the logic circuit synthesizes the multi-data-bit symbols into a plurality of sine waves and sums the sine waves to create a signal used by the line driver for transmission over the power line.

14. A method for coupling data-carrying symbols over a power line that carries an alternating current signal having a frequency or phase that varies, relative to a frequency or phase of previous cycles of the alternating current signal, the data-carrying symbols corresponding to respective information signals, the method comprising:
monitoring variations in the alternating current signal;
using an encoding circuit to define, at least in part, data useful for providing steps of a waveform;
in response to the monitored variations in the alternating current signal, feeding a line driver with stepped data that is processed for modulating the alternating current signal of the power line with the data-carrying symbols, wherein the steps are provided by using a feedback control loop to account for the monitored variations in the alternating current signal; and
coupling the data-carrying symbols over the power line, via the waveform corresponding to the stepped data.

15. The method of claim 14, wherein the steps are signal-level steps and are generated a predetermined number of times to account for the variations in the alternating current signal.

16. The method of claim 14, wherein feeding the line driver with stepped data includes generating one of a plurality of waveforms that would be responsive to monitored variations in the alternating current signal.

17. The method of claim 14, wherein feeding the line driver includes feeding the line driver with stepped data processed for modulating the alternating current signal of the power line with the data-carrying symbols that represent a combination of signals respectively representing different frequencies.

18. The method of claim 14, wherein feeding the line driver includes feeding the line driver with the steps in order to account for the variations in the alternating current signal.

19. The method of claim 14, wherein coupling the data-carrying symbols over a power line includes coupling the data-carrying symbols via the waveform that is locked to monitored variations in the frequency of the alternating current signal for consecutive cycles of the alternating current signal that have respectively different periods.

20. The method of claim 14, wherein coupling the data-carrying symbols over the power line includes coupling multi-data-bit symbols to the power line by conveying a set of discrete-frequency signals and a plurality of phase offsets between the discrete-frequency signals of the set.

\* \* \* \* \*